US012798599B2

(12) United States Patent
Minnerup et al.

(10) Patent No.: US 12,798,599 B2
(45) Date of Patent: Nov. 17, 2026

(54) DRIVING ASSISTANCE SYSTEM AND METHOD FOR OPERATING A DRIVING ASSISTANCE SYSTEM

(71) Applicant: Bayerische Motoren Werke Aktiengesellschaft, Munich (DE)

(72) Inventors: Pascal Minnerup, Unterschleissheim (DE); Peter Pedron, Augsburg (DE); Bernd Spanfelner, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 18/836,073

(22) PCT Filed: Feb. 3, 2023

(86) PCT No.: PCT/EP2023/052702
§ 371 (c)(1),
(2) Date: Aug. 6, 2024

(87) PCT Pub. No.: WO2023/148339
PCT Pub. Date: Aug. 10, 2023

(65) Prior Publication Data

US 2025/0153729 A1 May 15, 2025

(30) Foreign Application Priority Data

Feb. 7, 2022 (DE) ..................... 10 2022 102 782.1

(51) Int. Cl.
*B60W 50/14* (2020.01)
*G06V 20/58* (2022.01)

(52) U.S. Cl.
CPC ........... *B60W 50/14* (2013.01); *G06V 20/582* (2022.01); *B60W 2420/403* (2013.01);
(Continued)

(58) Field of Classification Search
CPC ........... B60W 50/14; B60W 2420/403; B60W 2540/215; B60W 2555/60;
(Continued)

(56) References Cited

U.S. PATENT DOCUMENTS 5,991,675 A 11/1999 Asanuma
2014/0358327 A1* 12/2014 Nordbruch ............ B60W 30/00 701/1
(Continued)

FOREIGN PATENT DOCUMENTS

DE 44 19 317 A1 12/1994
DE 10 2009 049 408 A1 4/2010
(Continued)

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).
(Continued)

*Primary Examiner* — Brian A Zimmerman
*Assistant Examiner* — Cal J Eustaquio
(74) *Attorney, Agent, or Firm* — Crowell & Moring LLP

(57) ABSTRACT

The present disclosure relates to a driving assistance system for a vehicle, which is designed to detect one or more factors providing one or more items of guidance for a situation in which the vehicle finds itself, to detect a confirmation action performed by a vehicle occupant; and to execute a driving assistance function according to the detected factor or the detected factors and according to the detected confirmation action. An influence of the detected confirmation action on the executing of the driving assistance function is weighted according to a reliability value associated with the vehicle occupant, which has been determined by the driving assis-
(Continued)

tance system on the basis of confirmation actions performed by the vehicle occupants in different situations in the past.

12 Claims, 2 Drawing Sheets

(52) U.S. Cl.
CPC ... *B60W 2540/215* (2020.02); *B60W 2555/60* (2020.02); *B60W 2556/10* (2020.02); *B60W 2556/40* (2020.02)

(58) Field of Classification Search
CPC ......... B60W 2556/10; B60W 2556/40; B60W 2420/408; B60W 40/08; B60W 50/082; B60W 60/0051; B60W 60/0059; B60W 2540/043; B60W 2540/045; B60W 2552/05; B60W 2552/50; B60W 2556/50; B60W 50/087; B60W 2040/0809; B60W 40/09; G06V 20/582
See application file for complete search history.

(56) References Cited

U.S. PATENT DOCUMENTS

| | | | |
|---|---|---|---|
| 2016/0231743 A1 | 8/2016 | Bendewald et al. | |
| 2018/0319402 A1 | 11/2018 | Mills et al. | |
| 2021/0016789 A1 | 1/2021 | Limbacher et al. | |
| 2022/0048529 A1* | 2/2022 | Ding .................. | B60W 60/001 |

FOREIGN PATENT DOCUMENTS

| | | |
|---|---|---|
| DE | 10 2011 083 944 A1 | 4/2013 |
| DE | 10 2013 110 852 A1 | 4/2015 |
| DE | 10 2018 110 629 A1 | 11/2018 |
| DE | 10 2018 203 426 A1 | 9/2019 |
| DE | 10 2019 133 316 A1 | 6/2021 |
| EP | 3 822 140 A1 | 5/2021 |

OTHER PUBLICATIONS

International Search Report (PCT/ISA/210) issued in PCT Application No. PCT/EP2023/052702 dated Apr. 3, 2023 with English translation (5 pages).

German-language Written Opinion (PCT/ISA/237) issued in PCT Application No. PCT/EP2023/052702 dated Apr. 3, 2023 with English translation (9 pages).

German-language Search Report issued in German Application No. 10 2022 102 782.1 dated Oct. 18, 2022 with partial English translation (12 pages).

* cited by examiner

DRIVING ASSISTANCE SYSTEM AND METHOD FOR OPERATING A DRIVING ASSISTANCE SYSTEM

BACKGROUND AND SUMMARY

The present disclosure relates to a driving assistance system, a method for operating a driving assistance system, a computer program and a computer-readable storage medium, on which such a computer program is stored. In particular, the present disclosure relates to the activation or performance of a driving assistance function for automated driving on the basis of a situation, for example an operating environment, in which a vehicle is currently situated.

Within the scope of the present document, the term "automated driving" is understood as meaning driving with automated longitudinal and/or lateral guidance. Automated driving may involve, for example, driving on the freeway for a relatively long time or driving for a limited time during parking. The term "automated driving" comprises automated driving with any degree of automation. Exemplary degrees of automation are assisted, partially automated, highly automated, fully automated and autonomous driving (each with an increasing degree of automation). The five degrees of automation mentioned above correspond to SAE levels 1 to 5 of the SAE J3016 standard (SAE—Society of Automotive Engineering). In the case of assisted driving (SAE level 1), the system performs the longitudinal or lateral guidance in certain driving situations. In the case of partially automated driving (SAE level 2), the system undertakes the longitudinal and lateral guidance in certain driving situations, but the driver must permanently monitor the system as in the case of assisted driving. In the case of highly automated driving (SAE level 3), the system undertakes the longitudinal and lateral guidance in certain driving situations without the driver having to permanently monitor the system; however, the driver must be able to take over the vehicle guidance within a certain time upon request by the system. In the case of fully automated driving (SAE level 4), the system undertakes the vehicle guidance in certain driving situations, even if the driver does not react to a request to intervene, with the result that the driver is dispensed with as a fallback level. In the case of autonomous driving (SAE level 5), the system can perform all aspects of the dynamic driving task which are also handled by a human driver under any road and environmental condition.

Some driving assistance functions may or are intended to be performed only in certain intended operating domains (operational design domains—ODD), for example certain operating environments. For example, provision may be made for a so-called congestion pilot to allow highly automated driving only on freeways up to a certain maximum speed, for example 60 km/h or 80 km/h. In such a case, it is an important prerequisite for the decision as to whether the congestion pilot can be activated that it is possible to determine with a high degree of certainty whether or not the relevant vehicle is currently on a freeway. Conventionally, the activation of such a driving assistance function, for instance by pressing a button on the steering wheel, is therefore offered to a user only when the driving assistance system assumes, on the basis of the information available to it, that the vehicle is in the suitable operating environment, that is to say, for example, on the freeway, with a sufficient degree of statistical certainty.

In order to achieve this, the driving assistance system can resort, for example, to the most accurate and reliable possible localization of the vehicle with respect to a digital map, for instance using differential GNSS. As an alternative or in addition to GNSS information, environmental-sensor-based determination or validation of the vehicle position can also be provided. For example, camera-based traffic sign recognition and/or camera-based or lidar-based capture of a physical separation between lanes can provide indications of whether the vehicle is currently driving on a freeway. A general localization and validation scheme that uses a plurality of independent sources of position information was described, for example, in the German patent application 10 2019 133 316.4 by the applicant.

The above-mentioned measures do not always suffice to distinguish with sufficient certainty, for example, between a journey on a freeway and a journey off the freeway. One reason may be that some sensor data are not available in a sufficient quality in a certain situation. In such a situation, it would not be possible to activate a certain driving assistance function (for example a congestion assistant) even if the vehicle were actually in the operating environment for which the driving assistance function is provided (for example on a freeway). The availability of the driving assistance function would therefore be unnecessarily restricted.

Such challenges may arise, in principle, not only in connection with the identification of a freeway as an operating environment and as a prerequisite for the ability to activate a driving assistance function, but also in connection with other—possibly safety-critical—situation assessments which may involve, for example, assessing whether the vehicle is currently driving in the correct lane or whether it correctly identifies a traffic situation in its environment.

On the basis of this, an object on which the present disclosure is based is to specify a driving assistance system and a method for operating a driving assistance system which make it possible to reliably detect a situation in which a vehicle is situated, in order to be able to perform a driving assistance function safely and at the same time with the greatest possible availability on the basis of this.

The object is achieved by means of the features of the independent patent claims.

Advantageous embodiments are described in the dependent patent claims.

It is pointed out that additional features of a patent claim dependent on an independent patent claim may form, without the features of the independent patent claim or only in combination with a subset of the features of the independent patent claim, a separate invention that is independent of the combination of all features of the independent patent claim and can be made into the subject matter of an independent claim, a divisional application or a subsequent application. This applies in the same manner to technical teachings that are described in the description and can form an invention independent of the features of the independent patent claims.

A first aspect of the present disclosure relates to a driving assistance system for a vehicle.

The vehicle may be a motor vehicle, in particular a road-based motor vehicle. The vehicle is preferably configured for at least partially automated driving through to highly automated driving or even autonomous driving. For example, a driving function within the driving assistance system may effect, in particular, automated longitudinal and/or lateral control of the vehicle, for instance in the form of a speed assistant, a lane keeping assistant or a congestion pilot.

The driving assistance system is configured to capture one or more circumstances that provide one or more indications of a situation in which the vehicle is (currently) situated; to capture a confirmation action performed by a vehicle occupant; and to perform a driving assistance function on the basis of the captured circumstance(s) and the captured confirmation action. In this case, an influence of the captured confirmation action on the performance of the driving assistance function is weighted on the basis of a trustworthiness value which is assigned to the vehicle occupant (for example in relation to influences of the other captured circumstances) and has been determined by the driving assistance system on the basis of confirmation actions performed by the vehicle occupant in various situations in the past.

In this case, the invention is based on the knowledge that, for example in the interests of improved availability of a driving assistance function, it may be useful to place a certain degree of trust in the decision by a user to activate the function. This is because the trust in the user can be justified in many cases in which the user deliberately confirms that he has carefully checked the requirements and considers the current situation to be suitable for performing the driving assistance function. In such a situation, it would be disadvantageous if the driving assistance system were not to offer a driving assistance function provided for the freeway, for example solely on account of a temporarily restricted availability of an environmental sensor, since it could not be determined with sufficient probability, for example solely on the basis of the available GNSS, map and environmental sensor data, that the vehicle is on the freeway. The invention therefore provides for the confirmation action of the user to also be used as an independent additional indication source.

In this case, the confirmation action of the user is particularly valuable as an additional indication source since a potential failure by the user to identify a dangerous situation or generally to correctly assess the requirements for performing the driving assistance function, for example, is independent of a possible sensor fault, E/E (electrics/electronics) fault or the like. Such considerations with regard to the independence of fault sources or the redundancy of information sources may be important, for example, for assessing the functional safety according to the ASIL standard.

According to the present disclosure, when deciding on the performance of the driving assistance function or the manner in which the driving assistance function is performed, the confirmation action of the user—for example in comparison with the other captured circumstances—is attributed a certain weight that depends on a position of trust assigned to the user. The position of trust of the user or the trustworthiness value assigned to the vehicle occupant can be included in a safety assessment, for example as a false-positive probability. For example, it can be estimated that a certain user will correctly identify dangerous situations in 90% of cases.

In this case, the trustworthiness value is based on confirmation actions performed—correctly or incorrectly—by the user in various situations in the past. An assessment of the confirmation actions performed in the past for the purpose of determining the trustworthiness value may comprise, for example, a subsequent analysis of recorded captured circumstances at times before, during and after the respective confirmation actions.

For example, it is conceivable for a comparatively low trustworthiness value to be initially assigned to a user, which results in a comparatively weak weighting of a confirmation action of this user when deciding on the performance of a driving assistance function. However, the user can gradually increase his trustworthiness value by way of a plurality of correct confirmation actions or confirmation actions appropriate to the situation in various situations (or can conversely reduce it by inappropriate confirmation actions), with the result that the influence of the confirmation actions can accordingly also change during future performances of the driving assistance function. In the positive case, this may result in a noticeably higher availability of a driving assistance function, for example.

The indications captured by the driving assistance system may provide for example—with a certain degree of certainty that is generally not a hundred percent—information relating to a certain current traffic situation or a certain operating environment in which the vehicle is situated. This may relate, for example, to the matter of whether or not the vehicle is currently driving on a freeway or a freeway-like road.

According to some embodiments, the capture of the circumstance(s) providing the indications may comprise locating the vehicle. For example, the localization can be carried out using a global satellite navigation system (for example differential GNSS). In particular, the capture of the circumstance(s) may comprise locating the vehicle with respect to digital map information. In this case, the digital map information may be provided, for example, in the form of a highly accurate digital map from a digital map memory which may be arranged in the vehicle. Alternatively, the digital map may also be transmitted to the vehicle from outside the vehicle, for example from a server, with the transmission preferably being carried out via a wireless communication interface.

Alternatively or additionally, the circumstance(s) can be captured using one or more sensors of an environmental sensor system of the vehicle. The environmental sensor system of the vehicle is generally configured to capture and provide information relating to the environment of the vehicle. The environmental sensor system may comprise, in particular, a camera, a depth camera, a radar sensor, a lidar sensor or a similar sensor. Such a sensor preferably operates contactlessly, for example by detecting electromagnetic waves or ultrasonic waves, and may be imaging. The environmental sensor system preferably comprises a plurality of different and/or statistically independent sensors, for example one or more lidar sensors and/or one or more radar sensors and/or one or more optical cameras.

When capturing the circumstance(s), traffic sign recognition, in particular camera-based traffic sign recognition, and/or camera-based or lidar-based capture of a physical separation between lanes may be provided. Such circumstances may provide indications, for example, of whether the vehicle is driving on a freeway. Possible relevant traffic signs are, inter alia, distance and exit signs typical of a freeway or distance beacons that usually announce an exit, inter alia, on German freeways.

The above-mentioned digital map may be based, for example, at least partially on data which are captured using sensors and were recorded during one or more reconnaissance journeys of a reconnaissance vehicle. Accordingly, the digital map may contain a plurality of layers, wherein, for example, one layer is based on data from a global satellite navigation system, a further layer is based on optical camera data and a further layer is based on lidar data. The various layers may contain features which can be detected by means of the respective sensor system.

The confirmation action of the vehicle occupant may comprise, for example, actuation of an operating element arranged in the vehicle interior, for instance in the region of a steering wheel. In this case, the operating element may be, for example, in a manner known per se, in the form of a push button, a turn and push switch, a toggle switch, a touchscreen element or the like. Alternatively or additionally, the confirmation action may also comprise a voice or gesture input on a man-machine interface configured for this purpose.

According to some embodiments, the confirmation action may be a necessary condition for performing the driving assistance function. For example, the confirmation action may be an activation confirmation by the vehicle occupant, in particular a driver of the vehicle, which is a necessary, but not necessarily sufficient, condition for the driving assistance function to be performed or for the driving assistance function to be performed in a particular manner. The influence of the confirmation action on the performance of the driving assistance function, which depends on the trustworthiness value of the vehicle occupant, can therefore relate both to a "whether" (perform or do not perform a driving assistance function) and to a "how" (manner in which the driving assistance function is performed).

According to one embodiment, the driving assistance system is configured, in particular, to capture one or more circumstances that provide one or more indications of whether the vehicle is (probably) in an operating environment for which a certain driving assistance function is provided (for example enabled); to capture the confirmation action performed by a vehicle occupant in the form of an activation confirmation; and to activate or not activate the driving assistance function on the basis of the captured circumstance(s) and the captured activation confirmation. When deciding whether the driving assistance function is activated, the captured activation confirmation is taken into account on the basis of the trustworthiness value, that is to say, for example, in relation to influences of the other captured circumstances.

For example, the operating environment for which the driving assistance function is provided may be a freeway or a freeway-like road (for example a German highway). In this case, the driving assistance function may be, for example, an SAE level 3 function provided or enabled specifically for the freeway or for freeway-like roads, for example a congestion pilot.

According to one development, the driving assistance system is also configured to output one or more indications to the vehicle occupant on the basis of the captured circumstance(s) and the trustworthiness value, in particular in order to inform the vehicle occupant of a criticality of his confirmation action (for example for activating the driving assistance function). The indication(s) may be output, for example, in an optically, haptically and/or acoustically perceptible manner. In this case, an escalation cascade of a plurality of different types of indications (for example increasing in intensity) which are effected at an interval of time may also be provided if there is initially no reaction by the vehicle occupant.

This development is based on the concept that there may be reasons to place only limited trust in the decision by the user to activate the driving assistance function. This is because the functionality is generally actually only offered to the user if all other validations have been successful anyway to a certain degree (that is to say if they confirm a journey on a freeway with a certain probability, for example). Therefore, under certain circumstances, the user can incorrectly "learn" that the driving assistance system is always correct in this respect and therefore can in turn confirm all situations. In this case, a false positive probability of 90% based on the confirmation actions of the vehicle occupant may be an excessively optimistic assumption, for example. In order to compensate for this, it is possible to indicate to the vehicle occupant in some situations in a dedicated manner via a user interface that his decision to perform the confirmation action or not is decisive. In other words, the vehicle occupant can be notified that his (possibly repeated) confirmation action is currently actually critical. For example, a second confirmation may be required if the freeway cannot be reliably identified on the basis of the other captured circumstances. Depending on the trustworthiness value of the user, there may be different levels of a repeated confirmation, for example. In addition, the driving assistance system can initially start in a reduced mode that requires more attention by the driver, that is to say with a tendency to more confirmation actions. Over time and, in particular, with an increasing trustworthiness value of the user, the frequency or number of required confirmation actions may then be reduced.

According to one embodiment, the driving assistance system may also comprise an identification apparatus for identifying the vehicle occupant, for example a user interface for inputting a personalized PIN, an interior camera, an iris scanner, a fingerprint sensor, an apparatus for recognizing a voiceprint or similar biometric features, or may resort to such an identification apparatus. This makes it possible to reliably and uniquely assign the trustworthiness value to the vehicle occupant.

According to a second aspect of the present disclosure, a method for operating a driving assistance system of a vehicle is proposed. The method can be carried out, for example, completely or partially by means of a driving assistance system according to the first aspect of the present disclosure. In other words, the driving assistance system proposed here may be configured to completely or partially carry out the method proposed here. Therefore, the features and embodiment variants described above and below can be used both in the driving assistance system and in the method.

According to the method, in a plurality of situations, in each case one or more circumstances that provide one or more indications of the respective situation (for instance a certain operating environment or a certain traffic situation) in which the vehicle is currently situated are captured. In addition, in the plurality of situations, in each case a confirmation action performed by a vehicle occupant is captured. A trustworthiness value assigned to the vehicle occupant is determined on the basis of the circumstances and confirmation actions captured in the plurality of situations. In a further situation, the following further steps are then carried out in the course of the method according to the present disclosure: capturing one or more circumstances that provide one or more indications of the situation in which the vehicle is situated; capturing a confirmation action performed by a vehicle occupant; and performing the driving assistance function on the basis of the circumstance(s) captured in the further situation and the confirmation action captured in the further situation, wherein an influence of the confirmation action captured in the further situation on the performance of the driving assistance function is weighted on the basis of the trustworthiness value.

According to one embodiment, the method specifically comprises the following steps:

in the plurality of situations, in each case

- capturing one or more circumstances that provide one or more indications of whether the vehicle is in an operating environment for which a certain driving assistance function is provided; and
- capturing the confirmation action in the form of an activation confirmation for activating the driving assistance function;

determining the trustworthiness value assigned to the vehicle occupant on the basis of the circumstances and activation confirmations captured in the plurality of situations;

in the further situation capturing one or more circumstances that provide one or more indications of whether the vehicle is in an operating environment for which the driving assistance function is provided;

capturing an activation confirmation performed by the vehicle occupant for activating the driving assistance function; and activating the driving assistance function on the basis of the circumstance(s) captured in the further situation and the activation confirmation captured in the further situation, wherein the activation confirmation captured in the further situation is weighted on the basis of the trustworthiness value when deciding whether the driving assistance function is activated.

As a basis for determining the trustworthiness value of a particular vehicle occupant, it is possible, for example, to analyze the captured circumstances and the confirmation action ex post, that is to say retrospectively, on the basis of recorded data in the course of the method. In other words, past decisions of the user can be retrospectively assessed.

For example, at least one captured circumstance that relates to a time (preferably a plurality of times) after the respective confirmation action can be taken into account for determining the trustworthiness value. In this case, recorded GNSS traces and/or recognized traffic signs at times shortly after the respective confirmation action can be used, for example, ex post to check the plausibility of (or refute) the appropriateness of the confirmation action. On the basis of the further captured circumstances and possibly using the alternative validation principles known in the prior art (cf., for example, the already mentioned German patent application 10 2019 133 316.4 by the applicant), it is possible to determine, for example, whether the vehicle was still on a freeway shortly after an activation decision by the user. For example, a GNSS trace may be evaluated in terms of a plausibility of whether the vehicle was actually on a freeway. It is generally significantly easier to identify errors ex post by resorting also to the additional sensor data that are "future" sensor data when seen from the time of the confirmation action. On the basis of this evaluation, it is possible to determine whether a user has incorrectly activated a congestion pilot, provided only for the freeway, on a highway or has attempted to activate it by his activation confirmation. If a user incorrectly confirms driving on a freeway, the trust placed in his future decisions by the driving assistance system can be reduced by means of a reduced trustworthiness value.

In order to obtain more data for measuring the trustworthiness of the vehicle occupant, provision may also be made, according to one embodiment variant, for the driving assistance system to sometimes request the vehicle occupant to confirm situations in which the confirmation action would not even suffice to activate the driving assistance function. If the vehicle occupant performs a confirmation action in such a situation, the driving assistance function would not be activated, but the captured confirmation action could, under certain circumstances, have a negative effect on the trustworthiness value of the vehicle occupant. For example, it is possible to capture how often a particular user attempts to activate a driving assistance function, provided only for freeways, on highways. Such empirical data can then be taken into account when determining the trustworthiness value of the user.

A third aspect of the present disclosure relates to a computer program comprising instructions which, when the computer program is executed by a (data) processing device, cause the latter to carry out the following steps:

in a plurality of situations, in each case receiving one or more items of information providing one or more indications of the respective situation in which the vehicle is situated; and receiving one or more items of information relating to a confirmation action performed by a vehicle occupant in the respective situation;

determining a trustworthiness value assigned to the vehicle occupant on the basis of the information relating to the respective situations and the respectively performed confirmation actions that is received in the plurality of situations;

in a further (later) situation receiving one or more items of information providing one or more indications of the situation in which the vehicle is situated;

receiving one or more items of information relating to a confirmation action performed by the vehicle occupant; and generating control signals for performing a driving assistance function on the basis of the information captured in the further situation, wherein an influence of the item(s) of information relating to the confirmation action that is/are captured in the further situation on the performance of the driving assistance function is weighted on the basis of the trustworthiness value.

The computer program according to the third aspect of the present disclosure can therefore be configured to carry out steps of the method according to the second aspect of the present disclosure when executed on a processing device.

For example, a processing device which is configured to execute the computer program according to the third aspect of the present disclosure may be part of a control system of the vehicle and, in particular, part of a driving assistance system according to the first aspect of the present disclosure. A processing device may comprise, for example, one or more processors (for example CPUs and/or GPUs) on which the necessary computing operations for executing the computer program according to the third aspect of the present disclosure or for carrying out the method according to the second aspect of the present disclosure take place.

A fourth aspect of the present disclosure relates to a computer-readable storage medium on which a computer program according to the third aspect is stored.

The statements made above and below with respect to the driving assistance system according to the first aspect of the present disclosure can accordingly also be related to the method according to the second aspect of the present disclosure and to the computer program and the computer-readable storage medium according to the third and fourth aspects of the present disclosure. Advantageous exemplary embodiments of the method according to the present disclosure, of the computer program according to the present disclosure and/or of the computer-readable storage medium according to the present disclosure, which are not explicitly described at this point and in the patent claims, correspond to the advantageous embodiments of the driving assistance system according to the present disclosure which are described in the description or in the patent claims, and vice versa.

BRIEF SUMMARY OF THE DRAWINGS

The present disclosure will now be explained in more detail on the basis of exemplary embodiments and with reference to the accompanying drawings. In this case, the features and combinations of features mentioned in the description and/or shown in the drawings alone can be used not only in the respectively stated combination, but also in other combinations or alone, without departing from the scope of the present disclosure.

DETAILED DESCRIPTION OF THE DRAWINGS

Figure 1:
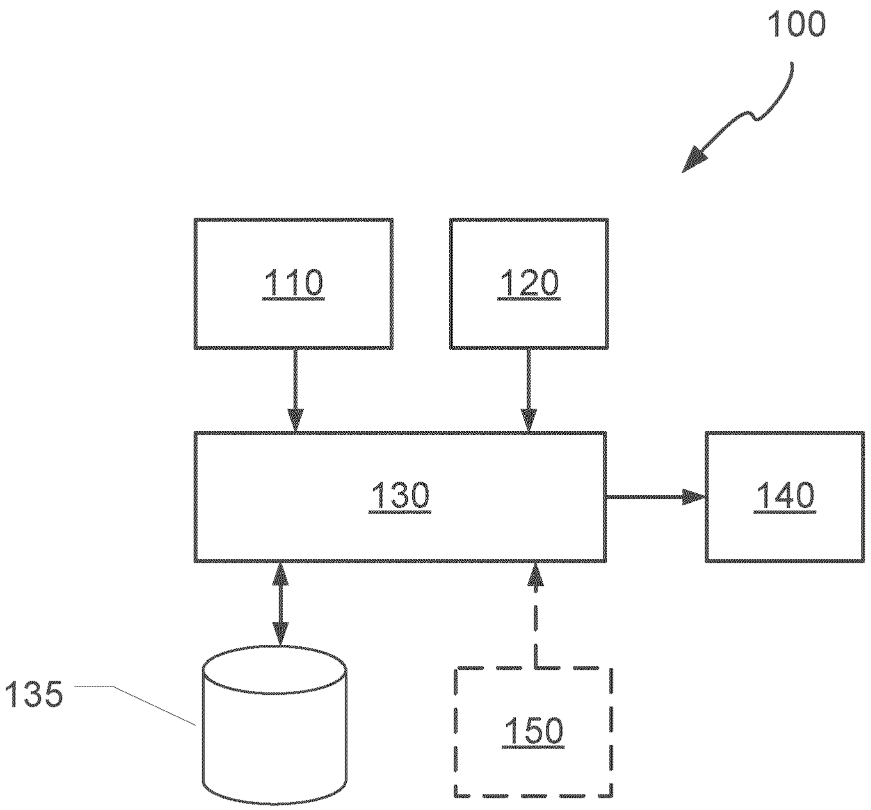
FIG. 1 shows, schematically and by way of example, a driving assistance system for a vehicle.

The present disclosure is explained by way of example below on the basis of the driving assistance system 100 illustrated in FIG. 1.

The driving assistance system 100 comprises a capture device 110 and is configured to use the capture device 110 to capture one or more circumstances that provide one or more indications of a situation in which the vehicle is situated. For example, the indication(s) may (with a certain probability) provide information as to whether the vehicle is in a certain operating environment, for example on a freeway, for which a certain driving assistance function (for example a congestion pilot) is provided or enabled.

The capture device 110 may comprise, for example, a GNSS receiver and/or an environmental sensor system of the vehicle. The environmental sensor system may comprise, in particular, a camera, a depth camera, a radar sensor, a lidar sensor and/or a similar sensor.

The capture device 110 is communicatively connected to a (data) processing device 130 which is configured to receive and logically further process information provided by the capture device 110. In the present exemplary embodiment, the processing device 130 is also connected to a data memory 135 which provides, for example, digital map information in the form of a highly accurate map.

The capture of the circumstance(s) may comprise, in particular, locating the vehicle with respect to such digital map information. Furthermore, traffic sign recognition, in particular camera-based traffic sign recognition, and/or camera-based or lidar-based capture of a physical separation between lanes may be provided in the course of capturing the circumstance(s). Such circumstances may provide indications of whether the vehicle is driving on a freeway, for example.

The driving assistance system 100 also comprises an input device 120 communicatively connected to the processing device 130 and is configured to use the input device 120 to capture a confirmation action performed by a vehicle occupant, for instance in the form of an activation confirmation. The input device 120 may comprise, for example, an operating element arranged in the vehicle interior, for instance in the region of a steering wheel. In this case, the operating element may be, for example, in a manner known per se, in the form of a push button, turn and push switch, a toggle switch, a touchscreen element or the like. Alternatively or additionally, the input device 120 may also comprise a man-machine interface for a voice or gesture input.

The driving assistance system 100 is configured to perform a driving assistance function on the basis of the captured circumstance(s) and on the basis of the captured confirmation action, for example an activation confirmation. For example, provision may be made for the driving assistance function to be activated or not activated on the basis of the captured circumstance(s), on the one hand, and the captured activation confirmation, on the other hand.

In this case, an influence of the captured confirmation action, that is to say, for example, the activation confirmation, on the performance of the driving assistance function is weighted on the basis of a trustworthiness value which is assigned to the vehicle occupant and has been determined by the driving assistance system 100 on the basis of confirmation actions performed by the vehicle occupant in various situations in the past. Specifically, the captured activation confirmation can be taken into account on the basis of the trustworthiness value, that is to say, for example, can be weighted in comparison with an influence of the other captured circumstances, for example when deciding whether or not the driving assistance function is activated.

In the exemplary embodiment according to FIG. 1, the captured circumstances and the captured confirmation action are logically process by means of the processing device 130. In this case, the processing device 130 can generate and output control signals for controlling a longitudinal and/or lateral guidance actuator system (not illustrated separately in FIG. 1) of the vehicle, taking into account the captured circumstances, the captured confirmation signals and the trustworthiness value, in order to perform (or not perform) the driving assistance function. For this purpose, the processing device 130 can retrieve the trustworthiness value from the data memory 135, for example, and can accordingly take it into account when performing the driving assistance function.

In order to be able to uniquely assign the trustworthiness value to the vehicle occupant in a reliable manner, the driving assistance system 100 may optionally comprise an identification apparatus 150 for identifying the vehicle occupant, for example a user interface for inputting a personalized PIN, an interior camera, an iris scanner, a fingerprint sensor, an apparatus for recognizing a voiceprint or similar biometric features, or may access such an identification apparatus 150. The identification apparatus 150 likewise has a data connection to the processing device 130, with the result that the processing device 130 can receive, from the identification apparatus 150, information relevant to uniquely assigning the individual trustworthiness value to the vehicle occupant.

In the exemplary embodiment shown in FIG. 1, the processing device 130 is also connected to an output device 140 and can control the latter in order to output one or more indications to the vehicle occupant on the basis of the captured circumstance(s) and the trustworthiness value, in particular in order to inform the vehicle occupant of a criticality of his confirmation action. The indication(s) may be output by means of the output device 140, for example in an optically, haptically and/or acoustically perceptible manner. In this case, an escalation cascade of a plurality of different types of indications (for example increasing in intensity) which are effected at a predetermined interval of time may also be provided if there is initially no reaction by the vehicle occupant.

Figure 2:
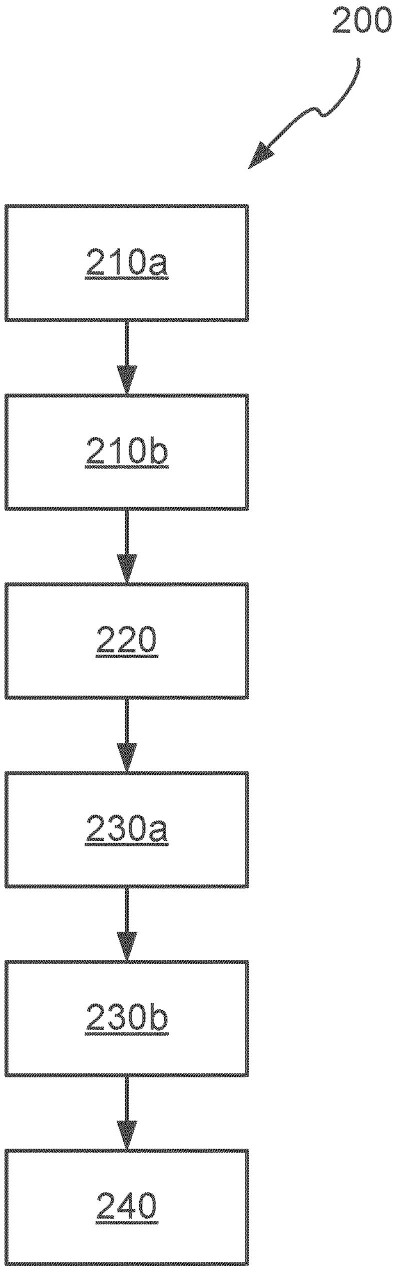
FIG. 2 shows a schematic flowchart of a method for operating a driving assistance system.

FIG. 2 schematically shows steps **210*a*-240 of a method 200 for operating a driving assistance system of a vehicle. The method can be carried out, for example, completely or partially by means of the driving assistance system 100 explained above with reference to FIG. 1. In other words, the driving assistance system 100 from FIG. 1 may be configured to completely or partially carry out the method according to FIG. 2**.

First of all, in a plurality of situations, in each case one or more circumstances that provide one or more indications of the respective situation (for instance a certain operating environment or a certain traffic situation) in which the vehicle is currently situated are captured (step 210*a*). In addition, in the plurality of situations, in each case a confirmation action performed by a vehicle occupant is captured (step 210*b*). A trustworthiness value assigned to the vehicle occupant is determined on the basis of the circumstances and confirmation actions captured in the plurality of situations (step 220).

In a further (later) situation, the following further steps are then carried out: capturing one or more circumstances that provide one or more indications of the situation in which the vehicle is situated (step 230*a*); capturing a confirmation action performed by a vehicle occupant (step 230*b*); and performing the driving assistance function on the basis of the circumstance(s) captured in the further situation and the confirmation action captured in the further situation, wherein an influence of the confirmation action captured in the further situation on the performance of the driving assistance function is weighted on the basis of the trustworthiness value (step 240).

For example, in steps 210*a* and 230*a*, circumstances that provide one or more indications of whether the vehicle is in an operating environment (for example on a freeway) for which a certain driving assistance function (for example a congestion pilot) is provided or enabled may specifically be captured in each case. In steps 210*b* and 230*b*, the respective confirmation actions may each be captured in the form of activation confirmations for activating this driving assistance function. The trustworthiness value can then be determined in step 220 on the basis of the activation confirmations captured in step 210*b* and the circumstances captured in step 210*a*. In step 240, the driving assistance function can be activated on the basis of the circumstance(s) captured in step 230*a* and on the basis of the activation confirmation captured in step 230*b*, wherein the activation confirmation captured in step 230*b* is weighted on the basis of the trustworthiness value determined in step 220 when deciding whether the driving assistance function is activated.

It goes without saying that, in the driving assistance system 100 according to FIG. 1, the capture steps 210*a*, 210*b*, 230*a* and 230*b* can be carried out by means of the capture device 110 or by means of the input device 120.

The determination step 220 and the performance step 240 may be at least partially carried out by means of the processing device 130. In this case, the processing device 130 may access the data memory 135 in order to store, for example, captured circumstances and determined (for example updated) trustworthiness values or in order to read out trustworthiness values previously stored therein for further data processing.

For example, at least one captured circumstance relating to a time after the respective confirmation action can be taken into account when determining 220 the trustworthiness value. In this case, recorded GNSS traces and/or recognized traffic signs at times shortly after the respective confirmation action can be used, for example, ex post to check the plausibility of (or refute) the appropriateness of the confirmation action. Such an evaluation can be retrospectively taken as a basis for determining, for example, whether a user has incorrectly activated a congestion pilot function, provided only for the freeway, on a highway or has attempted to activate it by means of an activation confirmation. In such a case, the trustworthiness value of this user can be reduced and trust placed in his future decisions by the driving assistance system can therefore be reduced.

For example, in the driving assistance system 100 from FIG. 1, the processing device 130 is configured to be controlled by means of a computer program which, when executed by the processing device 130, causes the latter to carry out the following steps:

in a plurality of situations, in each case receiving one or more items of information providing one or more indications of the respective situation in which the vehicle is situated; and receiving one or more items of information relating to a confirmation action performed by a vehicle occupant in the respective situation;

determining 220 a trustworthiness value assigned to the vehicle occupant on the basis of the information relating to the respective situations and the respectively performed confirmation actions that is received in the plurality of situations;

in a further (later) situation receiving one or more items of information providing one or more indications of the situation in which the vehicle is currently situated;

receiving one or more items of information relating to a confirmation action performed by the vehicle occupant; and generating control signals for performing 240 a driving assistance function on the basis of the information captured in the further situation, wherein an influence of the item(s) of information relating to the confirmation action that is/are captured in the further situation on the performance of the driving assistance function is weighted on the basis of the trustworthiness value.

In this case, the computer program may be stored on a computer-readable storage medium, example in the data memory 135.

The invention claimed is:

1. A driving assistance system for a vehicle, wherein the driving assistance system is configured to:

capture one or more circumstances that provide one or more indications of a situation in which the vehicle is situated;

capture a confirmation action performed by a vehicle occupant; and perform a driving assistance function on the basis of the captured one or more circumstances and on the basis of the captured confirmation action, wherein an influence of the captured confirmation action on a performance of the driving assistance function is weighted on a basis of a trustworthiness value which is assigned to the vehicle occupant and has been determined by the driving assistance system on the basis of confirmation actions performed by the vehicle occupant in various situations in the past and on the basis of at least one captured circumstance that relates to a time after the respective confirmation action.

2. The driving assistance system according to claim 1, wherein the driving assistance system is further configured to:

capture one or more circumstances that provide one or more indications of whether the vehicle is in an operating environment for which a certain driving assistance function is provided;

capture the confirmation action performed by a vehicle occupant in the form of an activation confirmation; and activate or not activate the driving assistance function on the basis of the captured one or more circumstances and on the basis of the captured activation confirmation, wherein, when determining whether the driving assistance function is activated, the captured activation confirmation is taken into account on the basis of the trustworthiness value.

3. The driving assistance system according to claim 2, wherein the operating environment for which the driving assistance function is provided is a freeway or a freeway-like road.

4. The driving assistance system according to claim 1, wherein the capture of the one or more circumstances comprises locating the vehicle with respect to a digital map.

5. The driving assistance system according to claim 1, wherein the capture of the one or more circumstances comprises automatic traffic sign recognition.

6. The driving assistance system according to claim 1, wherein the driving assistance system is configured to output one or more indications to the vehicle occupant on the basis of the captured one or more circumstances and on the basis of the trustworthiness value, in particular in order to make the vehicle occupant aware of a criticality of his confirmation action.

7. A method for operating a driving assistance system of a vehicle, the method comprising:

in a plurality of situations, in each case:

capturing one or more circumstances that provide one or more indications of the respective situation in which the vehicle is situated; and capturing a confirmation action performed by a vehicle occupant;

determining a trustworthiness value assigned to the vehicle occupant on the basis of the circumstances and confirmation actions captured in the plurality of situations, wherein at least one captured circumstance that relates to a time after the respective confirmation action is taken into account in determining the trustworthiness value; and in a further situation:

capturing one or more circumstances that provide one or more indications of the situation in which the vehicle is situated;

capturing a confirmation action performed by the vehicle occupant; and performing the driving assistance function on the basis of the one or more circumstances captured in the further situation and on the basis of the confirmation action captured in the further situation, wherein an influence of the confirmation action captured in the further situation on the performance of the driving assistance function is weighted on the basis of the trustworthiness value.

8. The method according to claim 7, further comprising:

in the plurality of situations, in each case:

capturing one or more circumstances that provide one or more indications of whether the vehicle is in an operating environment for which a certain driving assistance function is provided; and capturing the confirmation action in the form of an activation confirmation for activating the driving assistance function;

determining the trustworthiness value assigned to the vehicle occupant on the basis of the circumstances and activation confirmations captured in the plurality of situations; and in the further situation:

capturing one or more circumstances that provide one or more indications of whether the vehicle is in an operating environment for which the driving assistance function is provided;

capturing an activation confirmation performed by the vehicle occupant for activating the driving assistance function; and activating the driving assistance function on the basis of the circumstance(s) captured in the further situation and on the basis of the activation confirmation captured in the further situation, wherein the activation confirmation captured in the further situation is weighted on the basis of the trustworthiness value when deciding whether the driving assistance function is activated.

9. A non-transitory computer readable storage medium comprising a set of instructions which, when executed by a processing device, cause the processing device to perform acts of:

in a plurality of situations, in each case:

receive one or more items of information providing one or more indications of the respective situation in which the vehicle is situated; and receive one or more items of information relating to a confirmation action performed by a vehicle occupant in the respective situation;

determine a trustworthiness value assigned to the vehicle occupant on the basis of the information relating to the respective situations and the respectively performed confirmation actions that is received in the plurality of situations, wherein at least one captured circumstance that relates to a time after the respective confirmation action is taken into account in determining the trustworthiness value; and in a further situation:

receive one or more items of information providing one or more indications of the situation in which the vehicle is situated;

receive one or more items of information relating to a confirmation action performed by the vehicle occupant; and generate control signals for performing a driving assistance function on the basis of the information captured in the further situation, wherein an influence of the one or more items of information relating to the confirmation action that is captured in the further situation on the performance of the driving assistance function is weighted on the basis of the trustworthiness value.

10. The non-transitory computer readable storage medium of claim 9, wherein the set of instructions further cause the processing device to identify the vehicle occupant utilizing at least one of a personalized PIN, an iris scanner, a fingerprint sensor, or a biometric feature of the vehicle occupant.

11. The method of claim 7, further comprising:

Identifying the vehicle occupant utilizing at least one of a personalized PIN, an iris scanner, a fingerprint sensor, or a biometric feature of the vehicle occupant.

12. The driving assistance system of claim 1, wherein the driving assistance system is further configured to:

identify the vehicle occupant utilizing at least one of a personalized PIN, an iris scanner, a fingerprint sensor, or a biometric feature of the vehicle occupant.

* * * * *